(12) United States Patent
Blakemore et al.

(10) Patent No.: US 11,476,679 B2
(45) Date of Patent: Oct. 18, 2022

(54) DUAL VOLTAGE BATTERY AND METHOD FOR OPERATING THE SAME

(71) Applicant: A123 Systems LLC, Waltham, MA (US)

(72) Inventors: Bruce Blakemore, Plymouth, MI (US); Hamid Falahati, Windsor (CA); Patrick Larochelle, White Lake, MI (US)

(73) Assignee: A123 Systems, LLC, Waltham, MA (US)

(*) Notice: Subject to any disclaimer, the term of this patent is extended or adjusted under 35 U.S.C. 154(b) by 100 days.

(21) Appl. No.: 16/898,214

(22) Filed: Jun. 10, 2020

(65) Prior Publication Data

US 2020/0395762 A1 Dec. 17, 2020

Related U.S. Application Data

(60) Provisional application No. 62/860,034, filed on Jun. 11, 2019.

(51) Int. Cl.
*H02J 7/00* (2006.01)
*B60K 6/28* (2007.10)

(52) U.S. Cl.
CPC .............. *H02J 7/0013* (2013.01); *B60K 6/28* (2013.01); *B60Y 2200/92* (2013.01); *B60Y 2400/112* (2013.01); *H02J 2207/20* (2020.01)

(58) Field of Classification Search
CPC ...... H02J 7/0013; H02J 2207/20; H02J 1/082; H02J 7/0063; H02J 2310/48; B60K 6/28; B60Y 2200/92; B60Y 2400/112; H02M 3/1584; Y02T 10/92; Y02T 10/70

USPC ............................................. 320/116; 307/82
See application file for complete search history.

(56) References Cited

U.S. PATENT DOCUMENTS

| | | | |
|---|---|---|---|
| 6,879,138 B2* | 4/2005 | Dinh ................... | H02M 3/1584 323/284 |
| 7,365,661 B2* | 4/2008 | Thomas .............. | H02M 3/1584 341/117 |
| 7,969,121 B2* | 6/2011 | Smith ................. | H02M 3/1584 320/167 |

(Continued)

FOREIGN PATENT DOCUMENTS

| | | | | |
|---|---|---|---|---|
| CN | 104795994 A | * | 7/2015 | .......... H02M 3/1584 |
| DE | 102015104293 A1 | | 9/2016 | |

(Continued)

OTHER PUBLICATIONS

"µModule® Power Products—Over 100 µModule® Power Solutions," Digi-Key Website, Available Online at https://www.digikey.com/en/product-highlight/a/analog-devices/umodule-regulators, Available as Early as Nov. 4, 2019, 5 pages.

(Continued)

*Primary Examiner* — M Baye Diao
(74) *Attorney, Agent, or Firm* — McCoy Russell LLP

(57) ABSTRACT

A battery pack system and methods for operating the battery pack system are disclosed. In one example, the battery pack system may simultaneously output two different voltages from a stack of battery cells. One voltage may be applied to a first group of electric power consumers and the second voltage may be applied to a second group of electric power consumers.

18 Claims, 6 Drawing Sheets

(56) References Cited

U.S. PATENT DOCUMENTS

| | | | | |
|---|---|---|---|---|
| 8,115,446 | B2* | 2/2012 | Piccard | H02J 7/0018 |
| | | | | 320/104 |
| 8,125,182 | B2* | 2/2012 | Hashim | B60L 58/20 |
| | | | | 320/104 |
| 8,368,346 | B2* | 2/2013 | Batson | H02J 7/0071 |
| | | | | 320/103 |
| 8,710,810 | B1* | 4/2014 | McJimsey | G05F 1/462 |
| | | | | 323/272 |
| 9,800,069 | B2* | 10/2017 | Hashim | H02J 1/06 |
| 9,837,948 | B2* | 12/2017 | Kazuno | H02P 6/14 |
| 10,044,073 | B2* | 8/2018 | Jun | H01M 10/48 |
| 10,074,997 | B2* | 9/2018 | Vo | H02J 7/342 |
| 10,217,995 | B2* | 2/2019 | Inagaki | H01M 4/485 |
| 10,286,892 | B1* | 5/2019 | Johri | B60W 10/26 |
| 10,601,338 | B2* | 3/2020 | Rozman | H02M 7/23 |
| 11,081,746 | B2* | 8/2021 | Wagoner | H02J 3/38 |
| 2005/0212495 | A1 | 9/2005 | Leyten et al. | |
| 2009/0033293 | A1 | 2/2009 | Xing et al. | |
| 2013/0181675 | A1 | 7/2013 | Kawasaki et al. | |
| 2014/0070608 | A1 | 3/2014 | Achhammer et al. | |
| 2014/0176024 | A1 | 6/2014 | Butzmann et al. | |
| 2016/0028229 | A1* | 1/2016 | Mitsutani | H02M 3/158 |
| | | | | 307/82 |
| 2017/0264228 | A1* | 9/2017 | Kazuno | H02M 1/084 |
| 2019/0061537 | A1* | 2/2019 | Ge | H02K 3/28 |
| 2019/0176727 | A1* | 6/2019 | Haluska | G01R 31/378 |
| 2020/0006716 | A1* | 1/2020 | Wagoner | H01M 50/20 |
| 2021/0167610 | A1* | 6/2021 | Yoon | B60L 58/22 |

FOREIGN PATENT DOCUMENTS

| | | | | |
|---|---|---|---|---|
| JP | 2002262476 | A * | 9/2002 | H01M 10/46 |
| JP | 4438887 | B1 * | 3/2010 | B60L 50/16 |
| KR | 20110055776 | A | 5/2011 | |

OTHER PUBLICATIONS

ISA Korean Intellectual Property Office, International Search Report and Written Opinion Issued in Application No. PCT/US2020/037043, dated Sep. 23, 2020, WIPO, 11 pages.

* cited by examiner

DUAL VOLTAGE BATTERY AND METHOD FOR OPERATING THE SAME

CROSS REFERENCE TO RELATED APPLICATIONS

The present application claims priority to U.S. Provisional Application No. 62/860,034, entitled "DUAL VOLTAGE BATTERY AND METHOD FOR OPERATING THE SAME," and filed on Jun. 11, 2019. The entire contents of the above-identified application are hereby incorporated by reference for all purposes.

TECHNICAL FIELD

The present description relates to a battery that provides two different output voltages simultaneously. In one example, the battery pack provides a low output voltage for a first group of electric power consumers and a higher output voltage for a second group of electric power consumers.

BACKGROUND AND SUMMARY

A vehicle may operate with two different batteries supplying two different voltages to two groups of electric power consumers. One of the two groups of electric power consumers may operate via a higher voltage (e.g., 48 volts direct current (VDC)) power supply while the other of the two groups of electric power consumers may operate via a lower voltage (e.g., 12 VDC) power supply. The group of electric power consumers that operate on power received from the higher voltage battery may be activated when the vehicle's powertrain is activated. The group of electric power consumers that operate on power received from the lower voltage battery may include a group of devices that receive power continuously whether or not the vehicle is activated and a group of devices that receive electric power when selected vehicle operating conditions are met. While it may be desirable to operate all electric power consumers via a single voltage power supply, it may be impractical to do so due to component cost and sourcing issues. On the other hand, it may be difficult to find two locations on-board a vehicle where two different batteries may be stowed. In addition, the two different batteries may increase vehicle weight.

The inventors herein have recognized the above issues and developed a battery pack, comprising: a plurality of battery cells combined in series and parallel to generate a first voltage level; a plurality of buck regulator circuits electrically arranged in parallel and generating a second voltage level via power provided from the plurality of battery cells combined in series and parallel; and a circuit configured to receive a signal from external the battery pack to activate one or more of the plurality of buck regulator circuits.

By applying a plurality of buck regulator circuits that are electrically coupled to a plurality of battery cells, it may be possible to provide the technical result of building a single battery that may supply power at two different voltages to different groups of electrical power consumers. Further, one or more of the plurality of buck regulator circuits may be deactivated when larger current amounts are not requested so that the battery's efficiency may be maintained at a higher level. For example, if a large amount of current is requested to operate a starter motor of an internal combustion engine, then all of the plurality of buck regulator circuits may be activated to source a larger amount of current. However, if the larger amount of current is not requested, only a smaller group (e.g., one or two) of the plurality of buck regulator circuits may be activated to reduce parasitic losses within the battery pack.

The present description may provide several advantages. In particular, the battery pack may save space by supplying two voltages via a single battery pack. Further, the battery pack may simplify vehicle packaging and may reduce vehicle weight as compared to a vehicle that includes two discrete batteries. In addition, the battery pack may selectively switch between a higher efficiency mode and a high current output mode to improve battery pack functionality and performance.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE DEPICTED EMBODIMENTS

Figure 1:
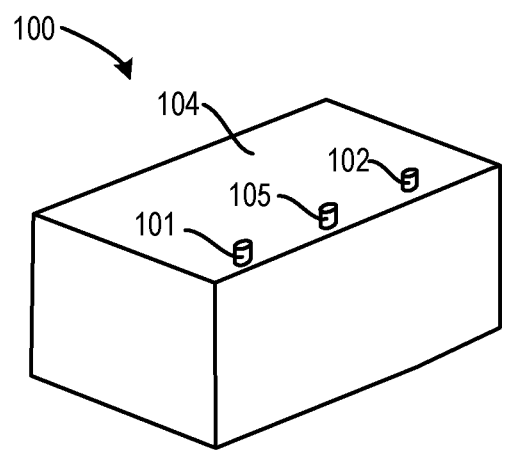
FIG. 1 shows a view of an example battery pack or assembly.
Figure 2:
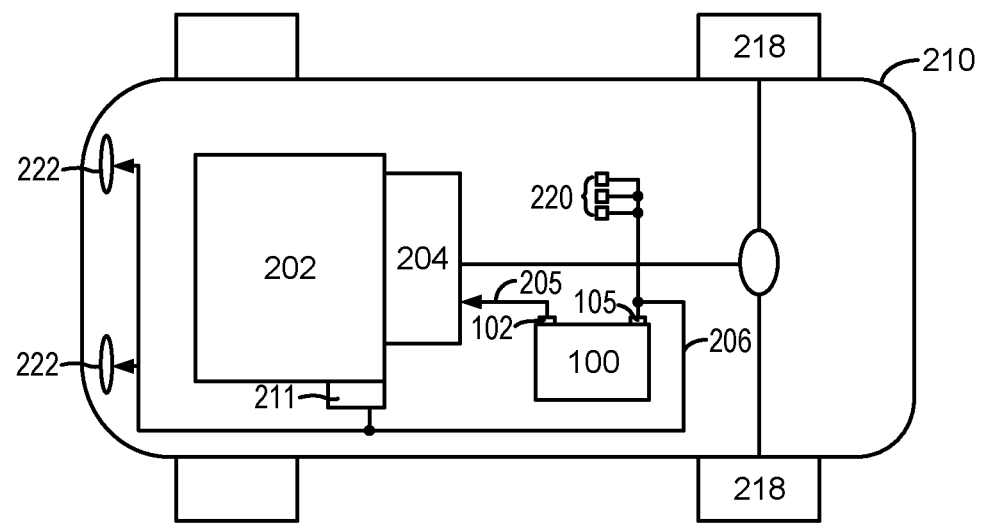
FIG. 2 shows a schematic view of an example system where the battery pack of FIG. 1 may be utilized.
Figure 3:
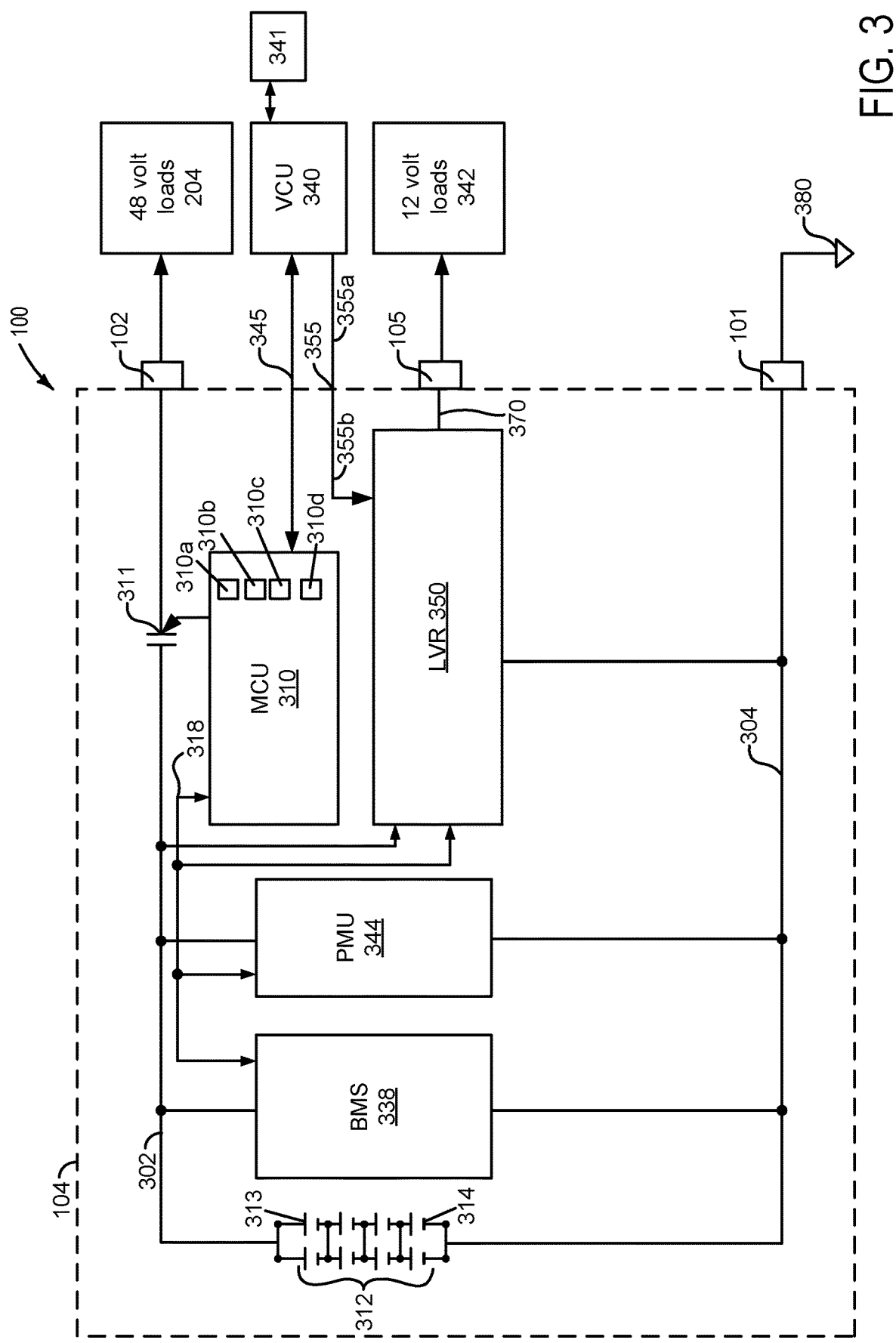
FIG. 3 shows a detailed view of battery pack components.
Figure 4:
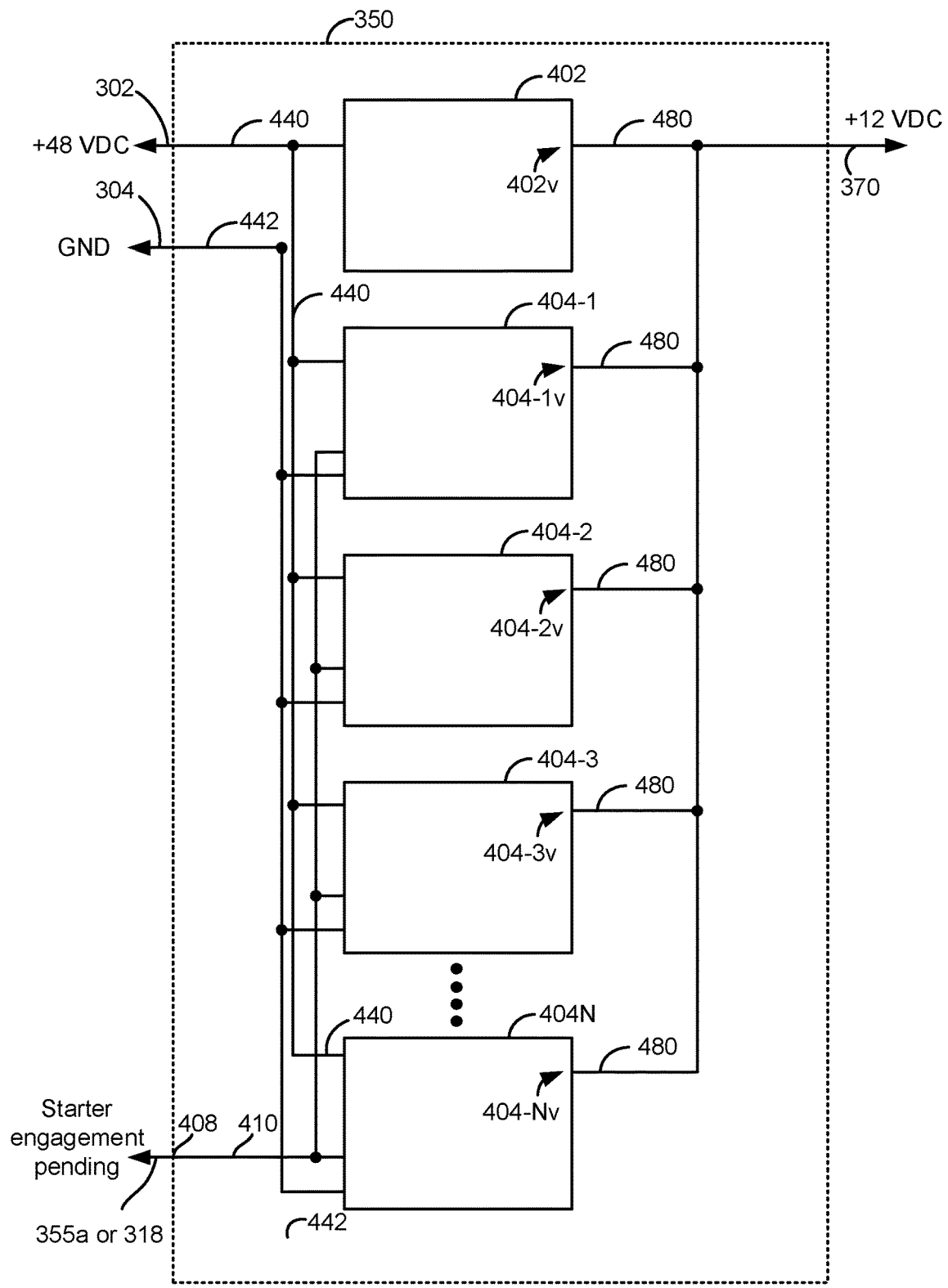
FIG. 4 shows a detailed view of a low voltage regulator circuit that includes a plurality of buck regulator circuits.
Figure 5:
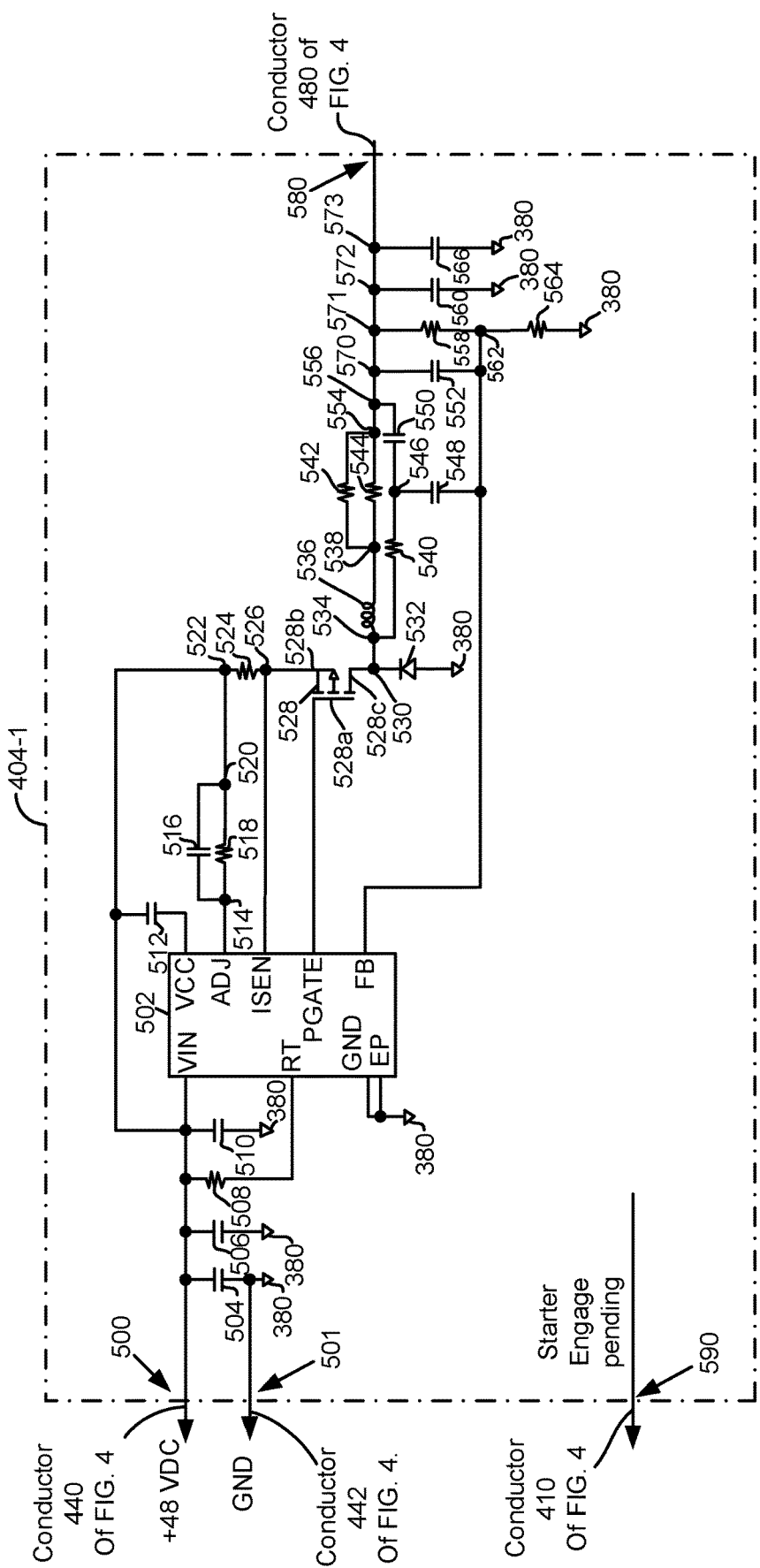
FIG. 5 shows a detailed view of a buck regulator circuit.
Figure 6:
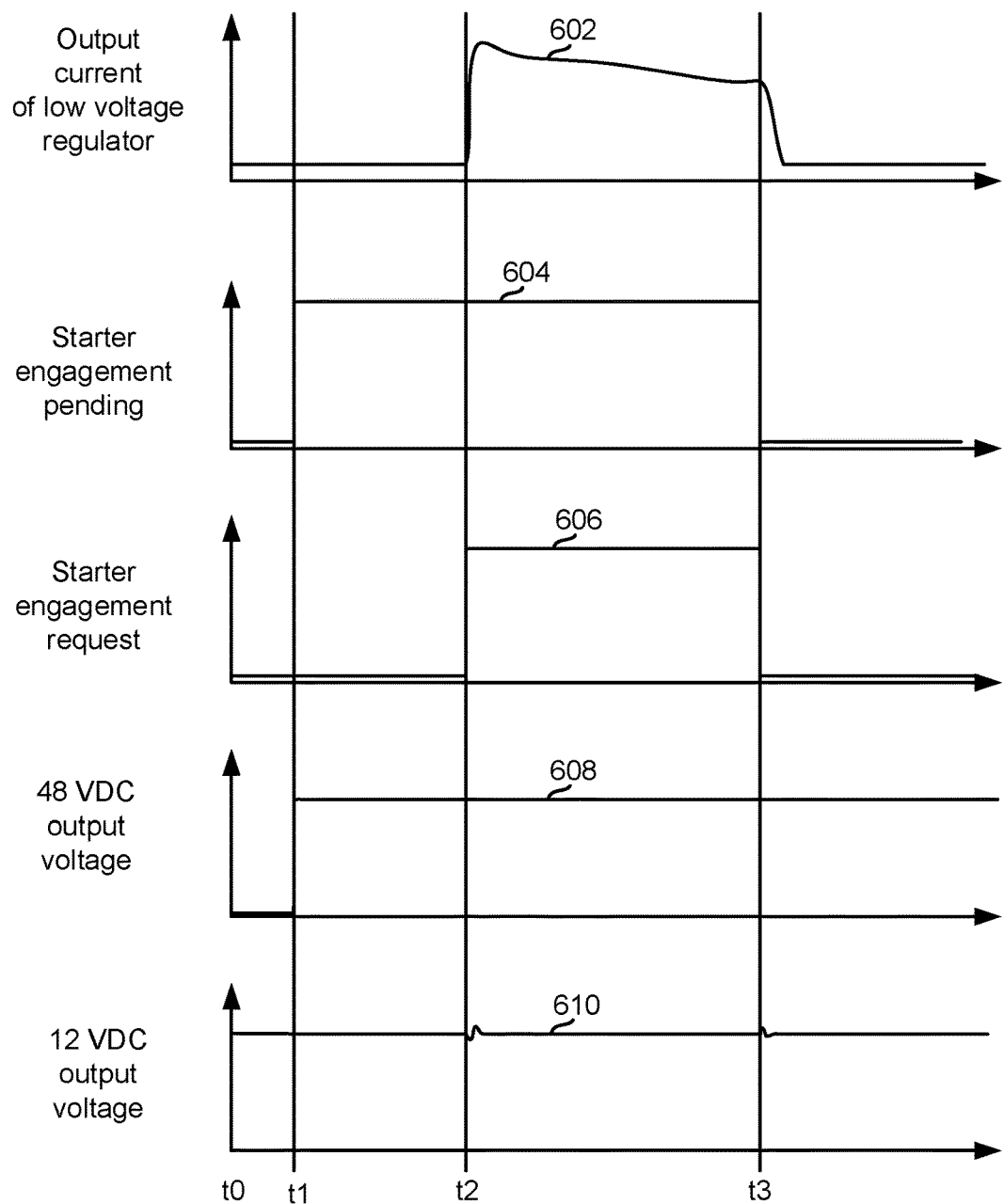
FIG. 6 shows a plot illustrating a battery pack operating sequence.

The present description is related to a battery pack that may supply electrical power to two groups of electric power consumers that operate at different voltages. In one example, the battery pack may be configured as shown in FIG. 1. The battery pack may be included in a vehicle as shown in FIG. 2. The battery pack may further be configured as shown in FIGS. 3-5, and the battery pack may operate as shown in FIG. 6. The battery pack may operate according to the method of FIG. 7.

As used herein, when referring to two components of a circuit, "coupled" may refer to "electrically coupled" unless otherwise specified. Accordingly, when referring to two components of a circuit, "directly coupled" may refer to the two components being electrically coupled without any electrical components (such as resistors, transistors, capacitors, etc.) disposed therebetween, excepting, in some examples, an electrical conductor (such as a wire).

FIG. 1 shows a view of an example battery pack 100. Battery pack 100 includes an external case 104 and three electrical terminals 101, 102, and 105. Electric terminal 101 is a negative terminal that may be externally tied to chassis ground. Electric terminal 102 is a higher voltage output terminal (e.g., a 48 VDC) and electric terminal 105 is a lower voltage output terminal (e.g., 12 VDC). The three terminals 101, 102, and 105 protrude from battery case 104. Negative terminal 101 is shown closest to lower voltage terminal 105. Higher voltage terminal 102 is shown farthest away from negative terminal 101. The terminal are arranged this way to provide separation between the different terminals and voltage levels.

Referring now to FIG. 2, an example vehicle 210 that includes battery pack 100 is shown. Vehicle 210 includes an internal combustion engine 202 and an electric machine 204 for supplying propulsive force to wheels 218. Internal combustion engine 202 may be selectively rotated via starter motor 211 when internal combustion engine 202 is being started. Electric machine 204 may solely propel vehicle 210, or alternatively, internal combustion engine 202 and electric machine 204 may combine their output to propel vehicle 210. In addition, electric machine 204 may charge battery pack 100 from time to time via converting the vehicle's kinetic energy into electrical energy. Terminal 102 is shown electrically coupled to electric machine 204 via conductor 205. Terminal 105 is shown electrically coupled to lights 222, vehicle sensors and actuators 220 (e.g., infotainment system, air conditioning system, engine sensors, window motors, door locks, etc.), and starter motor 211.

Referring now to FIG. 3, a detailed view of battery pack 100 is shown. Battery pack 100 includes a case or housing 104 that covers a plurality of battery cells 312 that are combined in series to increase battery pack voltage and in parallel to increase battery pack output capacity. The plurality of battery cells 312 is formed via individual battery cells 313. Conductor 302 is directly coupled to a battery cell that has a highest potential of the battery pack and conductor 304 is coupled to a battery cell that has a lowest potential of the battery pack. In one example, the potential difference between the lowest potential battery cells and the highest potential battery cells is 48 VDC, but other voltage may be provided via increasing the number of battery cells that are arranged in series. The plurality of battery cells provide electrical power to the battery monitoring system (BMS) 338, the power module unit (PMU) 344, the micro-controller unit (MCU) 310, and the low voltage power regulator (LVR) 350. The lowest potential battery cells of the plurality of battery cells 312 are electrically coupled to terminal 101. Terminal 101 is also shown being electrically coupled to chassis ground 380, thereby referencing the lowest potential battery cells of the plurality of battery cells 312 to chassis ground 380. If battery pack 100 is not electrically coupled to chassis ground, then conductor 304 is at the potential of a negative side of the lowest potential battery cell in battery pack 100. In this example, 314 shows a negative side of a battery cell and this battery cell and the battery cells it is connected to in parallel are the lowest potential battery cells in battery pack 100.

Conductor 302 may supply a voltage from the plurality of battery cells 312 to electric machines or electrical loads or higher voltage electrical power consumers 204 that are external to the battery pack 100 via optional contactor 311. Contactor 311 may be opened via MCU 310 to electrically isolate the plurality of battery cells 312 from the external higher voltage loads 204. In addition, MCU 310 may close contactor 311 to electrically couple battery cells 312 to terminal 102 and higher voltage electrical loads 204 in response to input or data received from vehicle control unit (VCU) 340 via communications link 345 (e.g., a controller area network (CAN), digital output, serial link, or other known communication device, which may also be referred to as an input to battery pack 100). If contactor 311 is not present battery cells 312 may be directly coupled to terminal 102. VCU 340 may interface with a human/machine interface 341 to activate and deactivate the vehicle 210. MCU 310 may command selected buck voltage regulators within LVR 350 to an off or stand-by state via communications link 318 (e.g., serial link, CAN, or other know communications link) based on data or requests presented to MCU 310 via VCU 340. By commanding selected buck regulators off during low current conditions, parasitic losses within the battery pack 100 may be reduced, thereby increasing the output capacity of battery pack 100. Alternatively, VCU 340 may request deactivation of one or more voltage regulators within LVR 350 via an input 355 via conductor 355a. LVR 350 supplies a regulated lower voltage (e.g., 12 VDC) to terminal 105 via conductor 370. Battery pack 100 may simultaneously supply power at a higher voltage to terminal 102 and higher voltage electrical power consumers 204 (e.g., electric machines 204 used for propulsion) while also supplying power at a lower voltage to terminal 105 and lower voltage electrical loads or lower voltage electrical power consumers 342 (e.g., engine starter motor, infotainment system, window motors, etc.). Higher voltage electrical loads 204, VCU 340, human/machine interface 341, and lower voltage electrical loads 342 are all external to battery pack 100.

MCU 310 may include read-only memory (ROM) 310a, a central processing unit (CPU) 310b, random access memory (RAM) 310c, and inputs and outputs 310d (e.g., CAN ports, serial ports, digital inputs/outputs, analog inputs/outputs). In one example, an input may include one or more of a digital input and a CAN. The CPU 310b may execute instructions that are stored in ROM and/or RAM and CPU 310b may interface with the real world via inputs and outputs 310d.

Referring now to FIG. 4, a detailed schematic of LVR 350 is shown. LVR 350 receives a higher potential voltage from the plurality of battery cells 312 via conductor 302, and the higher potential voltage is distributed to buck voltage regulators 402 and 404-1 to 404-N via conductor 440. LVR 350 is also connected to chassis ground 380 via conductor 304, and the ground reference 308 is distributed within LVR 350 via conductor 442. A starter engagement pending signal may be provided to input 408 via 355b or 318. The starter engagement pending signal may activate or deactivate buck voltage regulators 404-1 to 404-N, where the voltage regulators are numbered from 1 to N, and where N is an integer number based on an amount of current to be supplied to the lower voltage load. For example, a high level logic signal provided to input 408 may activate buck voltage regulators 404-1 to 404-N while a low level logic signal provided to input 408 may deactivate buck voltage regulators 404-1 to 404-N. The dots shown between regulators 404-3 and 404-N represent a variable number of regulators that may be determined by the amount of current being supplied to the external lower voltage electrical power consumers 342. For example, if a current capacity of 100 amperes is desired, twenty buck regulators may be coupled in parallel. If a current capacity of 150 amperes is desired, then thirty buck voltage regulators may be coupled in parallel. LVR 350 also includes one or more buck voltage regulators 402 (only one shown in this example) that supply a regulated lower voltage to external lower voltage electrical power consumers 342 continuously and these one or more regulators may not be activated or deactivated via the starter engagement signal that is provided to input 408. The outputs of each regulator 402v, 404-1v, 404-2v, 404-3v, 404-Nv are electrically coupled together via conductor 480 so that buck voltage regulators 402, 404-1, 404-2, 404-3, and 404-N are electrically coupled in parallel. Consequently, the current capacity of LVR 350 increases with every buck voltage regulator that is added up to a limit that is a function of the amount of current that is available from the plurality of battery cells 312. Conductor 480 may carry current from all of buck voltage regulators 404, 404-1, 404-2, 404-3, 404-N to conductor 370, which is directly electrically coupled to terminal 105. Thus, the plurality of buck voltage regulators 402 and 404-1 to 404-N may supply current to lower voltage electrical power consumers 342. Buck voltage regulators 404-1 to 404-N are identical, and buck voltage regulator 402 may be of a similar configuration, but buck voltage regulator 402 does not accommodate deactivation via the starter engagement signal since the starter engagement signal may not be input to buck voltage regulator 402.

Referring now to FIG. 5, a detailed schematic of buck voltage regulator 404-1 is shown. The solid lines between components represent conductors. Buck regulator 404-1 receives a higher potential voltage via conductor 440 at input 500. Buck regulator 404-1 also receives a lower potential voltage (e.g., chassis ground or the lowest potential of the battery pack) via conductor 442 at input 501. An internal combustion engine starter engagement pending signal is input to buck voltage regulator 404-1 at input 590 via conductor 410. A regulated lower output voltage (e.g., 12 VDC) is generated at output 580, which is coupled to conductor 480.

Buck voltage regulator 404-1 includes a first capacitor 504 that includes one side that is electrically coupled to conductor 440 and a second side that is electrically coupled to chassis ground 380 via conductor 442. A second capacitor 506 is in parallel with first capacitor 504 and it has a first side that is electrically coupled to conductor 440. A second side of second capacitor 506 is electrically coupled to chassis ground 380. A third capacitor 510 is in parallel with first capacitor 504 and it has a first side that is electrically coupled to conductor 440. A second side of third capacitor 510 is electrically coupled to chassis ground 380.

Buck voltage regulator 404-1 includes an integrated buck regulator circuit 502. In one example, integrated buck regulator circuit is a commercially available LM5085 manufactured by Texas Instruments Inc.®, of Dallas, Tex. However, in other examples, a different integrated buck regulator circuit may be substituted for the LM5085. The integrated buck regulator circuit 502 includes a VIN input, a RT input, GND and EP inputs, a VCC input, an ADJ input, a ISEN input, a PGATE output, and a FB input, which are identified by the same names in FIG. 5. The VIN input is directly coupled to conductor 440 and the RT input is coupled to one side of resistor 508. The other side of resistor 508 is directly coupled to conductor 440. The VCC input is electrically coupled to one side of capacitor 512 and the other side of capacitor 512 is directly coupled to conductor 440. The ADJ input is electrically coupled to one side of capacitor 516 and one side of resistor 518 at node 514. Capacitor 516 and resistor 518 are arranged in parallel. The other sides of capacitor 516 and resistor 518 are electrically coupled to conductor 440 via node 520. One side of current sense resistor 524 is shown electrically to conductor 440 at node 522 while the other side of current sense resistor 524 is shown electrically coupled to ISEN of integrated buck regulator circuit 502 at node 526.

Node 526 is directly electrically coupled to source 528b of P-channel field effect transistor (FET) 528. The gate 528a of P-channel FET 528 is should directly electrically coupled to PGATE output of integrated buck regulator circuit 502. Drain 528c of P-channel FET 528 is shown directly coupled to a cathode side of diode 532, one side of inductor 536, and one side of resistor 540 at nodes 530 and 534.

The anode side of diode 532 is directly electrically coupled to chassis ground 380. The other side of inductor 536 is directly coupled to resistor 542 and resistor 544 at node 538. Resistors 542 and 544 are configured in parallel and each includes a side that is coupled to node 554. Resistor 540 is directly coupled to one side of capacitor 548 and one side of capacitor 550. The other side of capacitor 548 is directly coupled to FB input of integrated buck regulator circuit 502, capacitor 552, resistor 558, and resistor 564. One side of capacitor 550 is directly electrically coupled to resistor 542, resistor 544, capacitor 552, resistor 558, capacitor 560, and capacitor 566 via nodes 556, 570, 571, 572, and 573. One side of resistor 564 is directly electrically coupled to node 562 and the other side of resistor 564 is electrically coupled to chassis ground 380. Capacitor 560 includes one side that is directly coupled to chassis ground 380 and another side that is coupled to node 572. Capacitor 566 includes one side that is directly coupled to chassis ground 380 and another side that is coupled to node 573. Nodes 554, 556, 570, 571, 572, and 573 are at a same potential and they are electrically coupled to output 580.

Thus, a higher potential voltage (e.g., 48 VDC) is input to buck voltage regulator 404-1 at input 500 and it selectively charges inductor 536 via FET 528 when FET 528 is turned on or closed. FET 528 also controls when inductor 536 discharges when FET 528 is turned off or opened. The output voltage of inductor 536 is a fraction of the higher potential voltage and it is filtered via the resistor/capacitor network including resistors 542, 544, and 540 and capacitors 548, 550, 552, 560, and 566. Output 580 is electrically coupled to conductor 480.

The system of FIGS. 1-5 provides for a first example of a battery pack, comprising: a plurality of battery cells combined in series and parallel to generate a first voltage level; a plurality of buck regulator circuits electrically arranged in parallel and generating a second voltage level via power provided from the plurality of battery cells combined in series and parallel; and a circuit configured to receive a signal from external the battery pack to activate one or more of the plurality of buck regulator circuits. A second example of the battery pack, optionally including the first example of the battery pack, further includes wherein the circuit is further configured to deactivate one or more of the plurality of buck regulator circuits and to not deactivate one or more of the plurality of buck regulator circuits. A third example of the battery pack, optionally including one or more of the first and second examples of the battery pack, further comprises a first terminal and a second terminal; wherein the first terminal is directly electrically coupled to the plurality of battery cells; and wherein the second terminal is directly electrically coupled to the plurality of buck regulator circuits. A fourth example of the battery pack, optionally including one or more of the first through third examples of the battery pack, further comprises a third terminal and a fourth terminal; wherein the third terminal is a negative terminal paired with the first terminal, and where the fourth terminal is a negative terminal paired with the second terminal. A fifth example of the battery pack, optionally including one or more of the first through fourth examples of the battery pack, further comprises an input to receive the signal. A sixth example of the battery pack, optionally including one or more of the first through fifth examples of the battery pack, further includes wherein the input is a controller area network. A seventh example of the battery pack, optionally including one or more of the first through sixth examples of the battery pack, further includes wherein the input is a digital input.

The system of FIGS. 1-5 also provides for a first example of a battery pack, comprising: a plurality of battery cells combined in series and parallel to generate a first voltage level; a plurality of buck regulator circuits electrically arranged in parallel and generating a second voltage level via power provided from the plurality of battery cells combined in series and parallel, the plurality of buck regulator circuits directly coupled to a first battery terminal; and a circuit configured to receive a signal from external the battery pack to activate one or more of the plurality of buck regulator circuits; and a contactor to selectively couple the plurality of battery cells to a second battery terminal, the first and second battery terminals protruding externally from a battery case. A second example of the battery pack, optionally including the first example of the battery pack, further includes wherein the circuit is configured to not activate one or more of the plurality of buck regulator circuits. A third example of the battery pack, optionally including one or more of the first and second examples of the battery pack, further includes wherein the plurality of buck regulator circuits are electrically coupled in parallel. A fourth example of the battery pack, optionally including one or more of the first through third examples of the battery pack, further comprises a first terminal and a second terminal; wherein the first terminal is electrically coupled to the plurality of battery cells via the contactor; and wherein the second terminal is directly electrically coupled to the plurality of buck regulator circuits. A fifth example of the battery pack, optionally including one or more of the first through fourth examples of the battery pack, further includes wherein the second voltage level is less than the first voltage level. A sixth example of the battery pack, optionally including one or more of the first through fifth examples of the battery pack, further includes wherein the signal from external the battery pack provides an indication of engaging a starter motor of an internal combustion engine. A seventh example of the battery pack, optionally including one or more of the first through sixth examples of the battery pack, further includes wherein the signal is received via a controller area network.

Referring now to FIG. 6, an example prophetic sequence for operating a battery that includes two different output voltages is shown. The sequence of FIG. 6 may be generated via the system of FIGS. 1-5 according to the method of FIG. 7. The plots occur at the same time and they are time aligned. Vertical lines at times t0-t3 represent times of interest during the sequence.

The first plot from the top of FIG. 6 is a plot of output electrical current of low voltage regulator 350 versus time. The vertical axis represents low voltage regulator output electrical current and the amount of electrical current increases in the direction of the vertical axis arrow. The horizontal axis represents time and time increases from the left side of the plot to the right side of the plot. Line 602 represents the low voltage regulator output current.

The second plot from the top of FIG. 6 is a plot of a state of an internal combustion engine starter engagement pending state versus time. The vertical axis represents the engine starter engagement pending state and the engine starter engagement pending state is asserted when trace 604 is at a higher level near the vertical axis arrow. The engine starter engagement pending state is not asserted when trace 604 is at a lower state near the horizontal axis. The horizontal axis represents time and time increases from the left side of the plot to the right side of the plot. Trace 604 represents the engine starter engagement pending state. The engine starter engagement pending state is provided before engine starter is actually engaged with the engine so that regulator circuits within the low voltage regulator have time to power-up before the engine starter is engaged with the internal combustion engine.

The third plot from the top of FIG. 6 is a plot of a state of an internal combustion engine starter engagement request state versus time. The vertical axis represents the engine starter engagement request state and the engine starter engagement request state is asserted when line 606 is at a higher level near the vertical axis arrow. The engine starter engagement request state is not asserted when line 606 is at a lower state near the horizontal axis. The horizontal axis represents time and time increases from the left side of the plot to the right side of the plot. Line 606 represents the engine starter engagement request state. The engine starter engagement request state is asserted when the engine starter is engaged.

The fourth plot from the top of FIG. 6 is a plot of the higher output voltage of the battery versus time. The vertical axis represents output voltage of the higher output voltage output of the battery. The output voltage increases in the direction of the vertical axis arrow. The horizontal axis represents time and time increases from the left side of the plot to the right side of the plot. Line 608 represents the output voltage of the higher voltage output of the battery pack.

The fifth plot from the top of FIG. 6 is a plot of the lower output voltage of the battery versus time. The vertical axis represents output voltage of the lower output voltage output of the battery. The output voltage increases in the direction of the vertical axis arrow. The horizontal axis represents time and time increases from the left side of the plot to the right side of the plot. Line 610 represents the output voltage of the lower voltage output of the battery pack.

At time t0, the vehicle is not activated and output of the lower voltage output of the battery is supplying 12 VDC to lower voltage power consumers of the vehicle (e.g., vehicle lighting system, sensors, infotainment system, etc.). The lower voltage output of the battery is supplying a smaller level of current (e.g., 5 amperes or less). The higher voltage output of the battery is not activated and the engine starter engagement pending state is not asserted. The engine start request is not asserted.

At time t1, the engine starter engagement pending state becomes asserted and the engine starter engagement request is not asserted. By delivering the engine starter engagement pending state before the engine starter engagement request is asserted, it may be possible for the many voltage regulators of low voltage regulator 350 to be operational before the engine starter engagement request is asserted so that the voltage regulators may supply a desired amount of current to the engine starter motor. By asserting the engine starter engagement pending state, the current capacity of the lower voltage output of the battery is increased (e.g., increased from 5 amperes to 150 amperes). The current capacity of the lower voltage output of the battery is increased via increasing a total number of activated lower buck voltage regulators that are coupled in parallel. The higher voltage output of the battery is activated via closing a contactor so that the sole battery pack begins to simultaneously output a higher voltage (e.g., 48 VDC) and a lower voltage (e.g., 12 VDC). The lower voltage output remains activated.

At time t2, the starter engagement request is asserted causing the starter to engage and rotate the engine. The current output of the lower voltage output of the battery increases to a higher level. The engine starter engagement pending request remains asserted and the higher voltage output of the battery continues to supply a higher voltage to the vehicle's electric system. The lower output voltage changes a small amount due to the increase in the low voltage battery output current, but the lower output voltage is maintained near 12 VDC.

At time t3, the engine starter engagement pending state and the engine starter engagement request are withdrawn so that the respective states are not asserted. This causes the starter motor to cease rotating the engine and the output current of the low voltage supply of the battery is reduced (not shown). The higher voltage output of the battery remains activated as does the lower voltage output of the battery. However, since the engine starter engagement pending state is not asserted, the lower voltage output current capacity of the battery is reduced (e.g., is reduced from 150 amperes to less than 20 amperes via switching off one or more buck voltage regulators). By reducing the current capacity of the lower voltage output of the battery, battery efficiency may be improved.

In this way, an externally generated signal (e.g., engine starter engagement pending) may be a basis for increasing electrical current output capacity of a lower voltage output of a battery. The same externally generated signal may be the basis for increasing efficiency of the battery when the externally generated signal is not asserted via deactivating one or more lower voltage regulators that provide the lower voltage output of the battery.

Figure 7:
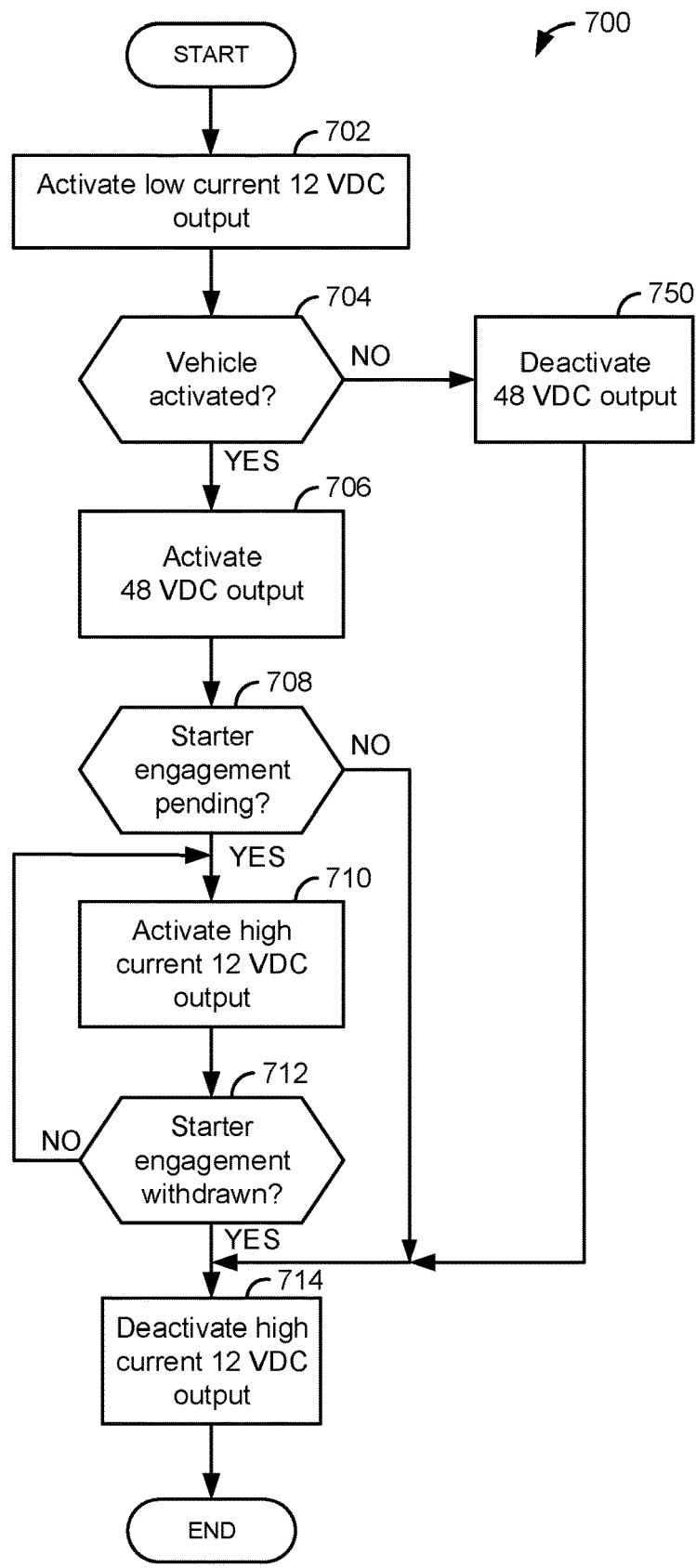
FIG. 7 shows a flowchart of a method for operating the battery pack.

Referring now to FIG. 7, a method for operating a battery pack that includes two different output voltages is shown. In one example, the first output voltage is a higher output voltage (e.g., 48 VDC) that is provided via selectively coupling battery cells to higher voltage electric power consumers that are external to the battery pack. The second output voltage is a lower output voltage (e.g., 12 VDC) that is provided via selectively coupling output of one or more voltage regulators to lower voltage electric power consumers that are external to the battery pack. The method of FIG. 7 may be incorporated into and may cooperate with the system of FIGS. 1-5. Further, at least portions of the method of FIG. 7 may be incorporated as executable instructions stored in non-transitory memory while other portions of the method may be performed via a controller transforming operating states of devices and actuators in the physical world.

At 702, method 700 activates a lower voltage output of a battery that is provided at a lower voltage terminal of the battery. The lower voltage output is provided at the lower voltage terminal of the battery is initially activated in a state where the lower voltage output has a lower current sourcing capacity (e.g., less than 20 amperes). The lower voltage output of the battery operating at a lower current capacity may be continuously activated whether or not the vehicle is activated. Method 700 proceeds to 704.

At 704, method 700 judges if the vehicle is activated. The vehicle may be activated via a human operator entering a proximity of the vehicle (e.g., within 10 meters) with a key fob or other hand held transmitter. Alternatively, the vehicle may be activated via a key switch or push button via an operator interface. The vehicle may be activated via a vehicle control unit (e.g., 340 of FIG. 3). If method 700 judges that the vehicle is activated, the answer is yes and method 700 proceeds to 706. Otherwise, the answer is no and method 700 proceeds to 750.

At 750, method 700 deactivates the higher voltage output of the battery. In one example, the higher voltage output of the battery may be deactivated via opening an optional contactor (e.g., 311 of FIG. 3) that selectively allows power to flow to higher voltage terminal 102. The MCU 310 may open contactor 311 in response to the vehicle being deactivated. The VCU 340 may supply a signal to MCU 310 to deactivate the higher voltage output of battery pack 100. Method 700 proceeds to 714.

At 706, method 700 activates the higher voltage output of the battery. In one example, the higher voltage output of the battery may be activated via closing contactor 311 that selectively allows power to flow to higher voltage terminal 102. The MCU 310 may close contactor 311 in response to the vehicle being activated. The VCU 340 may supply a signal to MCU 310 to activate the higher voltage output of battery pack 100. Method 700 proceeds to 708.

At 708, method 700 judges if an internal combustion engine starter engagement is pending. Method 700 may judge that an internal combustion engine starter engagement is pending in response to a signal or input from VCU 340 indicating that engine starter engagement is pending. VCU 340 may judge that a starter engagement is pending if an internal combustion engine is not started. Alternatively, VCU may judge that a starter engagement is pending if several conditions are present such as the engine is not operating (combusting fuel and rotating) and battery pack state of charge is less than a threshold level. If method 700 judges that starter engagement is pending, the answer is yes and method 700 proceeds to 710. Otherwise, the answer is no and method 700 proceeds to 714.

At 710, method 700 activates the lower voltage output of a battery that is provided at a lower voltage terminal of the battery at a higher electrical current capacity. The electrical current capacity of the lower voltage output is increased by activating a plurality of buck voltage regulators 404-1 to 404-N that are electrically coupled in parallel to increase the current output capacity of the low voltage regulator 350. For example, the output capacity of the LVR 350 provided at the lower voltage terminal of the battery is initially activated in a state where the lower voltage output has a lower current sourcing capacity (e.g., less than 20 amperes), but switching on or activating the additional buck regulators 404-1 to 404-N increases the electric current capacity to greater than a threshold amount of current (e.g., 150 amperes). Method 700 proceeds to 712.

At 712, method 700 judges if the internal combustion engine starter engagement has completed or is withdrawn. In one example, the starter engagement may be judged to be complete when engine speed is greater than a threshold speed. If method 700 judges that the engine starter engagement is complete, the answer is yes and method 700 proceeds to 714. Otherwise, the answer is no and method 700 returns to 710.

At 714, method 700 deactivates the high current lower voltage output, but the lower current lower voltage output remains activated. In one example, method 700 decreases the electrical current capacity of the lower voltage output by deactivating a plurality of buck voltage regulators 404-1 to 404-N that are electrically coupled in parallel to decrease the current output capacity of the low voltage regulator 350 and increase efficiency of the LVR 350. For example, switching off or deactivating the additional buck regulators 404-1 to 404-N decreases the electric current capacity to less than a threshold amount of current (e.g., 20 amperes). Method 700 proceeds to exit.

In this way, method 700 may selectively activate and deactivate buck voltage regulators that are electrically coupled in parallel and that are part of a low voltage regulator to increase or decrease current output capacity of the battery's lower voltage output. In this example, two current levels are described, but different numbers of voltage regulators may be activated to increase the current capacity of the lower voltage output of the battery pack. For example, the low voltage regulator may include 50 regulators that are coupled in parallel. The battery pack may be initially activated with one voltage regulator and then two additional voltage regulators may be activated for each additional 10 amperes of current capacity that is desired or requested for the lower voltage output of the battery pack. Thus, if an additional 100 amperes of current capacity was requested for the lower voltage output of the battery pack, then twenty additional regulators would be activated to increase the current capacity of the lower voltage output terminal of the battery pack. Of course, the actual number of buck regulators activated or deactivated may be adjusted depending on the current output capacity of the buck regulators.

Thus, the method of FIG. 7 provides for a first example of a method for operating a battery pack, the method comprising: supplying electrical power at a first voltage to a first group of electric power consumers via a plurality of battery cells in the battery pack; and supplying electrical power at a second voltage to a second group of electric power consumers via a plurality of voltage regulators included in the battery pack, the plurality of voltage regulators electrically coupled to the plurality of battery cells. A second example of the method, optionally including the first example of the method, further comprises activating one or more of the plurality of voltage regulators in response to a signal generated external to the battery pack. A third example of the method, optionally including one or more of the first and second examples of the method, further includes wherein the signal generated external to the battery pack provides an indication that a starter motor is engaged or is about to engage an internal combustion engine. A fourth example of the method, optionally including one or more of the first through third examples of the method, further comprises deactivating one or more of the plurality of voltage regulators in response to the signal generated external to the battery pack. A fifth example of the method, optionally including one or more of the first through fourth examples of the method, further includes wherein supplying electrical power at the first voltage and supplying electrical power at the second voltage occur simultaneously. A sixth example of the method, optionally including one or more of the first through fifth examples of the method, further includes wherein the plurality of voltage regulators are electrically coupled to a location of highest potential of the plurality of battery cells.

The subject matter of the present disclosure includes all novel and nonobvious combinations and subcombinations of the various systems and configurations, and other features, functions, and/or properties disclosed herein.

As will be appreciated by one of ordinary skill in the art, routines described in FIG. 7 may be represented by instructions for a controller and may be represented by one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A battery pack, comprising:
a plurality of battery cells combined in series and parallel to generate a first voltage level;
a DC/DC converter having a plurality of regulators electrically arranged in parallel and generating a second voltage level via power provided from the plurality of battery cells combined in series and parallel;
a circuit configured to receive a signal from external the battery pack to activate the DC/DC converter, the signal indicative that a starter motor is engaged or is about to engage an internal combustion engine;
a first terminal directly electrically coupled to the plurality of battery cells and electrically coupled to an electric machine supplying propulsive force to wheels; and
a second terminal directly electrically coupled to the DC/DC converter.

2. The battery pack of claim 1, wherein the circuit is further configured to deactivate the DC/DC converter and to not deactivate the DC/DC converter.

3. The battery pack of claim 1, wherein the first terminal is directly electrically coupled to the plurality of battery cells via a closed contactor; and
wherein the second terminal is directly electrically coupled to the plurality of buck regulator circuits.

4. The battery pack of claim 1, further comprising a third terminal;
wherein the third terminal is a negative terminal paired with the first terminal.

5. The battery pack of claim 1, further comprising an input to receive the signal.

6. The battery pack of claim 5, wherein the input is a controller area network.

7. The battery pack of claim 5, wherein the input is a digital input.

8. A battery pack, comprising:
a plurality of battery cells combined in series and parallel to generate a first voltage level;
a plurality of buck regulator circuits electrically arranged in parallel and generating a second voltage level via power provided from the plurality of battery cells combined in series and parallel, the plurality of buck regulator circuits directly coupled to a first battery terminal;
a circuit configured to receive a signal from external the battery pack to activate one or more of the plurality of buck regulator circuits; and a contactor to selectively couple the plurality of battery cells to a second battery terminal, the first and second battery terminals protruding externally from a battery case.

9. The battery pack of claim 8, wherein the circuit is configured to not activate one or more of the plurality of buck regulator circuits.

10. The battery pack of claim 8, wherein the plurality of buck regulator circuits are electrically coupled in parallel.

11. The battery pack of claim 8, further comprising a first terminal and a second terminal;
wherein the first terminal is electrically coupled to the plurality of battery cells via the contactor; and
wherein the second terminal is directly electrically coupled to the plurality of buck regulator circuits.

12. The battery pack of claim 8, wherein the second voltage level is less than the first voltage level.

13. The battery pack of claim 8, wherein the signal from external the battery pack provides an indication of engaging a starter motor of an internal combustion engine.

14. The battery pack of claim 8, wherein the signal is received via a controller area network.

15. A method for operating a battery pack, the method comprising:

supplying electrical power at a first voltage to a first group of electric power consumers via a plurality of battery cells in the battery pack;
supplying electrical power at a second voltage to a second group of electric power consumers via a plurality of voltage regulators included in the battery pack, the plurality of voltage regulators electrically coupled to the plurality of battery cells; and
activating one or more of the plurality of voltage regulators in response to a signal generated external to the battery pack, wherein the signal generated external to the battery pack provides an indication that a starter motor is engaged or is about to engage an internal combustion engine.

16. The method of claim 15, further comprising deactivating one or more of the plurality of voltage regulators in response to the signal generated external to the battery pack.

17. The method of claim 15, wherein supplying electrical power at the first voltage and supplying electrical power at the second voltage occur simultaneously.

18. The method of claim 15, wherein the plurality of voltage regulators are electrically coupled to a location of highest potential of the plurality of battery cells.

* * * * *